(12) United States Patent
Zhang et al.

(10) Patent No.: US 12,181,739 B2
(45) Date of Patent: Dec. 31, 2024

(54) BACKLIGHT MODULE AND DISPLAY PANEL

(71) Applicant: WUHAN CHINA STAR OPTOELECTRONICS TECHNOLOGY CO., LTD., Wuhan (CN)

(72) Inventors: Zhihan Zhang, Wuhan (CN); Zheng Zhou, Wuhan (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 17/769,772

(22) PCT Filed: Mar. 14, 2022

(86) PCT No.: PCT/CN2022/080577
§ 371 (c)(1),
(2) Date: Apr. 18, 2022

(87) PCT Pub. No.: WO2023/164971
PCT Pub. Date: Sep. 7, 2023

(65) Prior Publication Data
US 2024/0160055 A1  May 16, 2024

(30) Foreign Application Priority Data

Mar. 3, 2022 (CN) .......................... 202210204769.X

(51) Int. Cl.
*G02F 1/1333* (2006.01)
*G02F 1/13357* (2006.01)

(52) U.S. Cl.
CPC .. *G02F 1/133314* (2021.01); *G02F 1/133608* (2013.01)

(58) Field of Classification Search
CPC ..................... G02F 1/133314; G02F 1/133608
See application file for complete search history.

(56) References Cited

U.S. PATENT DOCUMENTS

| | | | |
|---|---|---|---|
| 2011/0261585 A1 | 10/2011 | Shibata et al. | |
| 2020/0183205 A1 | 6/2020 | Chen et al. | |
| 2022/0046810 A1* | 2/2022 | Liu | G02F 1/133608 |

FOREIGN PATENT DOCUMENTS

| | | |
|---|---|---|
| CN | 1512237 A | 7/2004 |
| CN | 102518984 A | 6/2012 |

(Continued)

OTHER PUBLICATIONS

Machine translation of CN106125405A (Year: 2016).*

*Primary Examiner* — Lucy P Chien
(74) *Attorney, Agent, or Firm* — Dickinson Wright PLLC

(57) ABSTRACT

The present disclosure provides a backlight module and a display panel, wherein the backlight module includes a backboard and a widening member, the widening member is disposed on at least one side of the outer frame opposite to the accommodation chamber and detachably connected to the outer frame. As such, when on-board display screens having a same visual area size but different appearance sizes are used, only the widening member needs to be changed to meet the requirements of the overall appearance size. The outer frame can be used in common, and thus a mold for the outer frame can be used in common, thereby significantly reducing the number of mold of the outer frame of the backlight module, and thereby reducing a cost of the backlight module.

20 Claims, 3 Drawing Sheets

(56) References Cited

FOREIGN PATENT DOCUMENTS

| | | |
|---|---|---|
| CN | 102645766 A | 8/2012 |
| CN | 102830517 A | 12/2012 |
| CN | 104020591 A | 9/2014 |
| CN | 106125405 A | 11/2016 |
| CN | 106707622 A | 5/2017 |
| CN | 107065300 A | 8/2017 |
| CN | 206515578 U | 9/2017 |
| CN | 107632460 A | 1/2018 |
| CN | 207908839 U | 9/2018 |
| KR | 20120066928 A | 6/2012 |

\* cited by examiner

BACKLIGHT MODULE AND DISPLAY PANEL

CROSS-REFERENCE TO RELATED APPLICATIONS

This application is a U.S. National Stage of International Application No. PCT/CN2022/080577, filed on Mar. 14, 2022, which claims the benefit and priority of Chinese Patent Application No. 202210204769.X, filed on Mar. 3, 2022, the entire contents of which are incorporated herein by reference.

TECHNICAL FIELD

The present disclosure relates to a display technology field, and in particular, to a backlight module and a display panel.

BACKGROUND

With the development of a modern vehicle industry, in-vehicle equipment is increasingly pursuing personalized design while satisfying basic functions thereof. As a non-standard part, an on-board display screen needs to meet various customization requirements in a product development process. At present, a visual area size of the on-board display screen on the market is relatively fixed. However, due to different designs of overall vehicles, the on-board display screens with the same visual area size tend to have various appearance sizes (external dimensions or outline dimensions). An external structure of the on-board display screen is usually formed by combing a bottom sheet metal and an outer frame. As for vehicles having the same visual area size but different appearance sizes, it is necessary to make special backlight molds to manufacture the outer frames of the on-board display screens, which leads to a higher cost and more difficult control of the on-board display screen.

Technical Problems

The present disclosure provides a backlight module and a display panel to alleviate a technical problem of a higher cost of a current on-board display screen.

Technical Solutions

To solve the above problem, the present disclosure provides the following technical solutions:

An embodiment of the present disclosure provides a backlight module including:
- a backboard including a bottom board and an outer frame fixedly connected to the bottom board, wherein the outer frame surrounds the bottom board to form an accommodation chamber; and
- a widening member disposed on at least one side of the outer frame opposite to the accommodation chamber and detachably connected to the outer frame.

In a backlight module according to an embodiment of the present disclosure, a first sliding groove is disposed on the outer frame, and a first protrusion is disposed at a position of the widening member corresponding to the first sliding groove, and the first protrusion is accommodated within the first sliding groove and slidable in the first sliding groove.

In a backlight module according to an embodiment of the present disclosure, the first sliding groove includes a first sub-groove and a second sub-groove in communication with each other, the first protrusion includes a first sub-protrusion and a second sub-protrusion that are fixedly connected, the first sub-protrusion is accommodated within the first sub-groove and slidable in the first sub-groove, and the second sub-protrusion is accommodated within the second sub-groove and slidable in the second sub-groove.

In a backlight module according to an embodiment of the present disclosure, an opening size of the first sub-groove is larger than an opening size of the second sub-groove, and the second sub-groove is located on a side of the first sub-groove away from the accommodation chamber.

In a backlight module according to an embodiment of the present disclosure, a plurality of second protrusions are disposed on an inner wall of the second sub-groove, second grooves are disposed at positions of the second sub-boss corresponding to the second bosses, and each of the second bosses is located within each of the second grooves.

In a backlight module according to an embodiment of the present disclosure, a stopper is further disposed on the outer frame, and the first sliding groove stops at the stopper.

In a backlight module according to an embodiment of the present disclosure, a vertical section shape of the second boss is a right-angled inverted trapezoidal shape, wherein a right-angled side of the right-angled inverted trapezoidal shape is close to the stopper.

In a backlight module according to an embodiment of the present disclosure, a first chamfer is further disposed on a side of the outer frame away from the stopper, and a second chamfer is disposed on a side of the widening member close to the stopper.

In a backlight module according to an embodiment of the present disclosure, a width of the second boss is less than a width of the second groove, and a height of the second boss is less than a depth of the second groove.

In a backlight module according to an embodiment of the present disclosure, an interval between two adjacent ones of the second bosses is 30 mm to 50 mm.

In a backlight module according to an embodiment of the present disclosure, a plurality of the widening members are disposed on a side of the outer frame opposite to the accommodation chamber, and the plurality of the widening members are detachably connected to each other.

In a backlight module according to an embodiment of the present disclosure, widths of the plurality of the widening members are different.

In a backlight module according to an embodiment of the present disclosure, the widening members are disposed on both opposite sides of the outer frame opposite to the accommodation chamber, and widths of the widening members on the both sides are same or different.

An embodiment of the present disclosure further provides a display panel, wherein the display panel includes a liquid crystal cell and a backlight module of any one of the foregoing embodiments, and the liquid crystal cell is located in a light-exiting direction of the backlight module.

Beneficial Effects

In a backlight module and a display panel according to the present disclosure, the backlight module includes a backboard and a widening member, the backboard includes a bottom board and an outer frame fixedly connected to the bottom board, the outer frame surrounds the bottom board to form an accommodation chamber. The widening member is disposed on at least one side of the outer frame opposite to the accommodation chamber, and detachably connected to the outer frame. The widening member is disposed to be fixedly connected to the outer frame, such that an entire width of the outer frame may be adjusted. As such, when on-board display screens having a same visual area size but different appearance sizes are used, only the widening member needs to be changed to meet the requirements of the overall appearance size. The outer frame can be used in common, and thus a mold for the outer frame can be used in common, thereby significantly reducing the number of mold of the outer frame of the backlight module, and thereby reducing a cost of the backlight module.

BRIEF DESCRIPTION OF THE DRAWINGS

In order to more clearly illustrate the technical solutions in the art or embodiments of the present disclosure, the accompanying drawings depicted in the description of the art or the embodiments will be described below. It will be apparent that the accompanying drawings in the following description are merely some embodiments of the present disclosure, and other drawings may be obtained from these drawings without creative effort by those skilled in the art.

EMBODIMENT OF THE PRESENT DISCLOSURE

Figure 1:
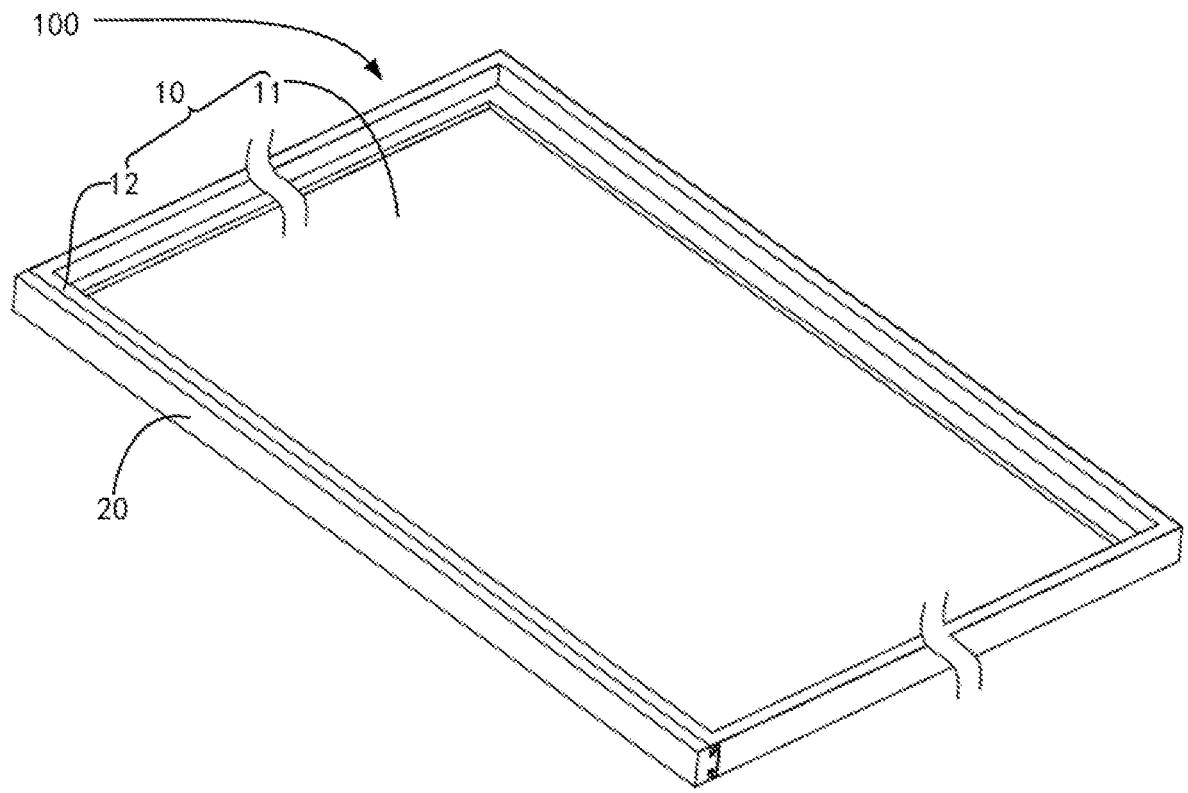
FIG. 1 is a structural schematic view of a part of a backlight module according to an embodiment of the present disclosure.

The description of the following embodiments refers to the attached drawings to illustrate specific embodiments in which the present disclosure can be implemented. The directional terms mentioned in the present disclosure, such as [up], [down], [front], [back], [left], [right], [inner], [outer], [side], etc., are only the direction of the attached drawings. Therefore, the directional terms used are used to describe and understand the present disclosure, rather than to limit the present disclosure. In the drawings, units with similar structures are indicated by the same reference numerals. In the drawings, the thicknesses of some layers and regions are exaggerated for clarity of understanding and ease of description. That is, the size and thickness of each component shown in the drawings are arbitrarily shown, but the present disclosure is not limited thereto.

As for a higher cost of current on-board display screens, the inventors of the present disclosure have found that it is because that the on-board display screens with same visual area sizes tend to have various appearance sizes due to different designs of overall vehicles. As for vehicles having different appearance sizes, it is necessary to make special backlight molds, which requires higher cost to make a mold, leading to a higher cost and more difficult control of the on-board display screen.

To this end, the inventors of the present disclosure provide a backlight module and a display panel to solve the problem of the higher cost of the above-described on-board display screen.

Figure 2:
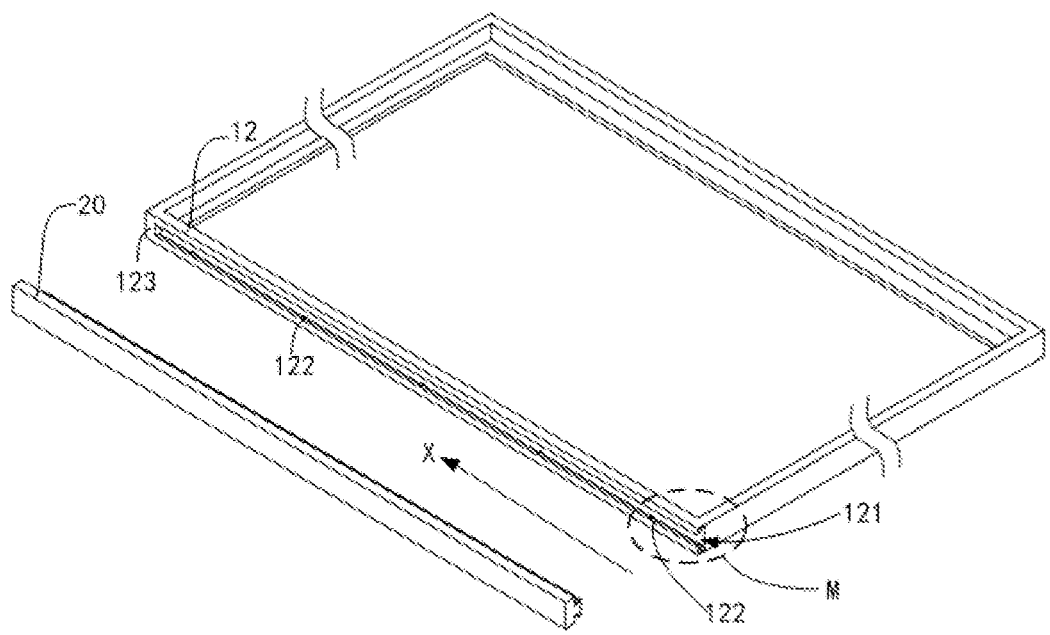
FIG. 2 is an exploded structural schematic view of the backlight module in FIG. 1.
Figure 3:
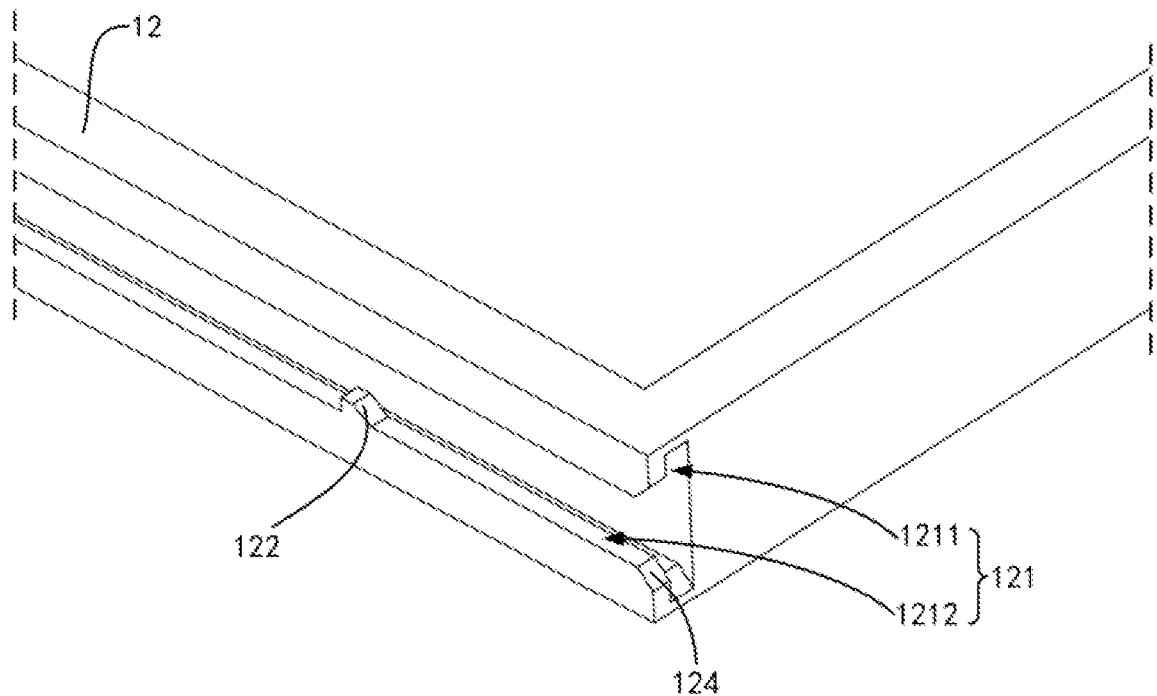
FIG. 3 is an enlarged detail schematic view at a portion M in FIG. 2.
Figure 4:
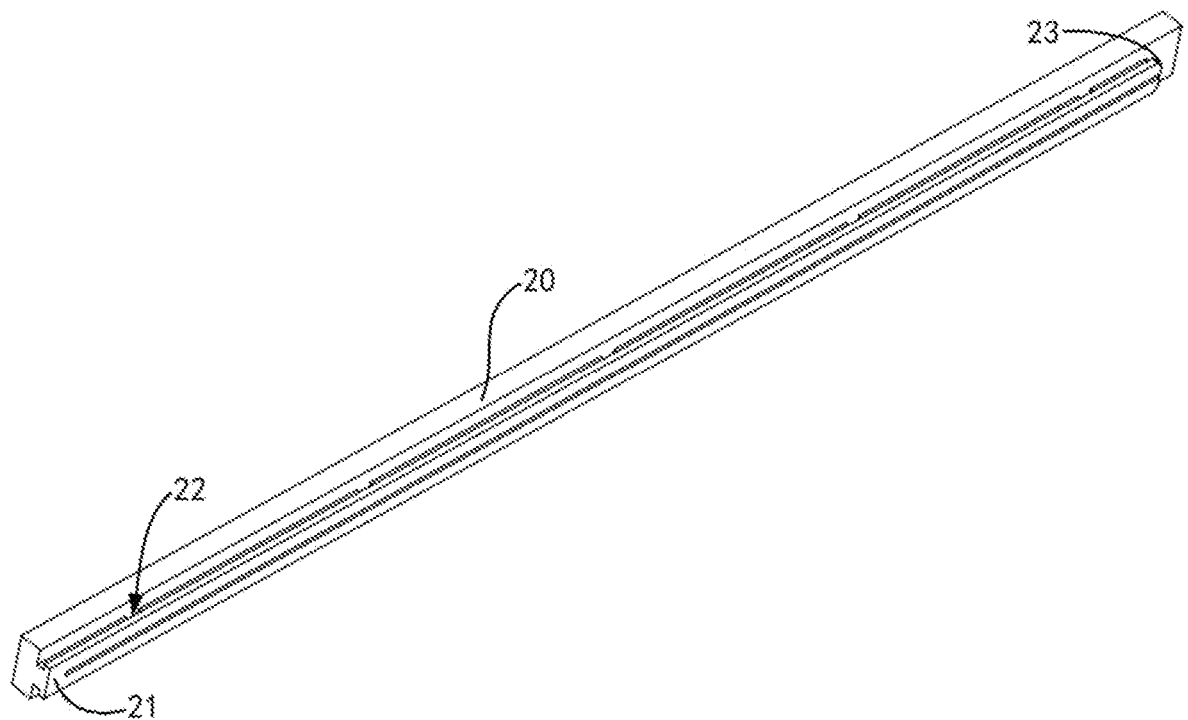
FIG. 4 is a detail schematic view of a widening member in FIG. 2.
Figure 5:
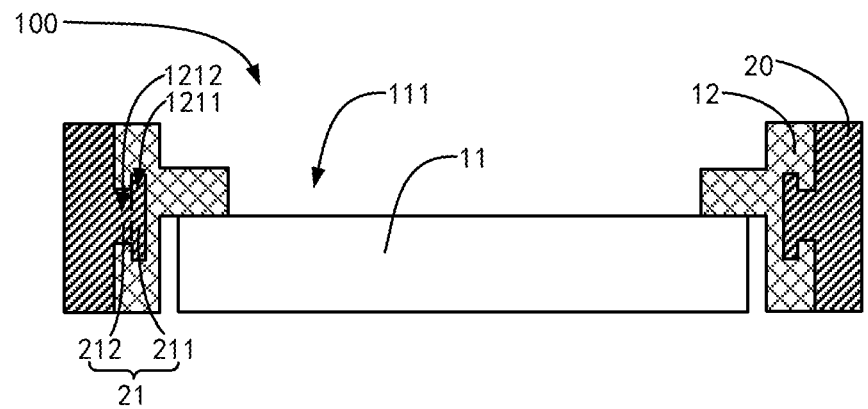
FIG. 5 is a structural schematic view of a cross section of a backlight module according to an embodiment of the present disclosure.
Figure 6:
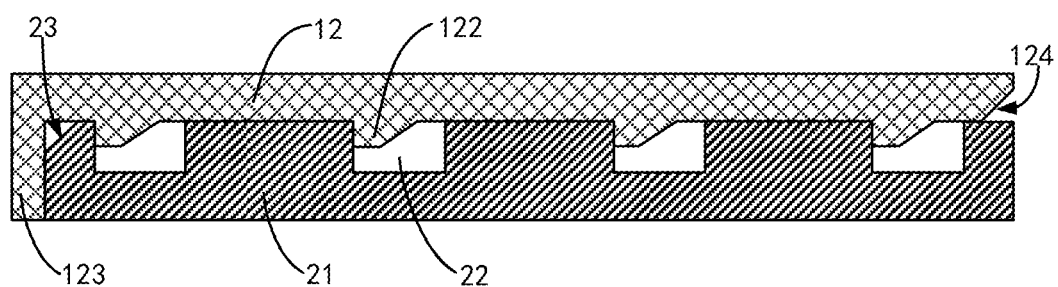
FIG. 6 is a detail structural schematic view of a combination of a widening member and an outer frame according to an embodiment of the present disclosure.

Specifically, in conjunction with FIGS. 1 to 6, FIG. 1 is a structural schematic view of a part of a backlight module according to an embodiment of the present disclosure, FIG. 2 is an exploded structural schematic view of the backlight module in FIG. 1, FIG. 3 is an enlarged structural schematic view at a portion M in FIG. 2, FIG. 4 is a detail schematic view of a widening member in FIG. 2, FIG. 5 is a structural schematic view of a cross section of a backlight module according to an embodiment of the present disclosure, and FIG. 6 is a detail structural schematic view of a combination of a widening member and an outer frame according to an embodiment of the present disclosure. The backlight module 100 includes a backboard 10 and a widening member 20. The backboard 10 includes a bottom board 11 and an outer frame 12 fixedly connected to the bottom board 11, and the outer frame 12 surrounds the bottom board 11 to form an accommodation chamber 111. The widening member 20 is disposed on at least one side of the outer frame 12 opposite to the accommodation chamber 111, and is detachably connected to the outer frame 12.

The widening member 20 detachably connected to the outer frame 12 is provided so that an overall width of the outer frame 12 can be adjusted. Thus, when on-board display screens having a same visual area size but different appearance sizes are used, only the widening member 20 needs to be changed to meet requirements of overall appearance sizes. The outer frame 12 can be used in common, and thus a mold for the outer frame 12 can be used in common, thereby significantly reducing the number of mold of the outer frame 12 of the backlight module 100 is made, and thereby reducing a cost of the backlight module 100.

Alternatively, the bottom board 11 is a sheet metal bottom board, and the outer frame 12 is an outer frame of a glue frame material. The outer frame 12 and the bottom board 11 can be fixedly connected by way of screws or the like. However, the present disclosure is not limited thereto. The outer frame 12 and the bottom board 11 of the present disclosure may also be integrally arranged to realize a glue-iron integrated backboard 10. The outer frame 12 surrounds the bottom plate 11 to form the accommodation chamber 111. The backlight module 100 further includes a light source, an optical film, and the like disposed within the accommodation chamber 111. The light source may be provided in an edge-lighting type or a bottom-lighting type. The optical film sheet includes a reflection sheet, a light guide plate, a diffusion sheet, a brightening film, and the like.

A first sliding groove 121 is disposed on the outer frame 12. A first boss 21 is disposed at a position of the widening member 20 corresponding to the first sliding groove 121. The first boss 21 is accommodated within the first sliding groove 121 and slidable in the first sliding groove 121, so that the widening member 20 and the outer frame 12 are detachably connected to each other. Of course, the connection between the widening member 20 and the outer frame 12 is not limited thereto. For example, the widening member 20 and the outer frame 12 may further be fixedly connected by way of screws, welding, bonding, or the like. Alternatively, the widening member 20 may be a mechanism member formed of metal, plastic, or the like.

It should be noted that the outer frame 12 surrounds the bottom board, and a shape of the outer frame 12 may be arranged in a quadrilateral shape, a circular shape or the like according to actual requirements. In the present disclosure, the shape of the outer frame 12 is described as a quadrilateral shape as an example. The outer frame 12 includes four jambs, and the widening member 20 is arranged on the jambs of the outer frame 12, so that the width of the outer frame 12 may be adjusted according to actual requirements. Meanwhile, according to the outer frame width actually to be realized, the widening member 20 may be disposed on at least one bezel of the outer frame 12, that is, the widening member 20 is disposed on at least one jamb of the outer frame 12 opposite to the accommodation chamber 111.

How the widening member 20 and the outer frame 12 are fixedly connected will be explained below in a specific embodiment.

Alternatively, the first sliding groove 121 of the outer frame 12 includes a first sub-groove 1211 and a second sub-groove 1212 in communication with each other. Correspondingly, the first boss 21 of the widening member 20 includes a first sub-boss 211 and a second sub-boss 212 that are fixedly connected. The first sub-boss 211 is accommodated within the first sub-groove 1211 and slidable in the first sub-groove 1211. The second sub-boss 212 is accommodated within the second sub-groove 1212 and slidable in the second sub-groove 1212.

Alternatively, an opening size of the first sub-groove 1211 is larger than an opening size of the second sub-groove 1212, and the second sub-groove 1212 is located on a side of the first sub-groove 1211 away from the accommodation chamber 111, such that the first sliding groove 121 is integrally convex-shaped. Correspondingly, the first boss 21 is T-shaped as a whole, so that when the first boss 21 is accommodated within the first sliding groove 121, the widening member 20 is prevented from moving up and down and back and forth with respect to the outer frame 12 connected thereto.

It can be understood that arrangements of the first sub-groove 1211 and the second sub-groove 1212 are not limited thereto. For example, in another embodiment, the opening size of the first sub-groove 1211 may be smaller than the opening size of the second sub-groove 1212, and the first boss 21 is still accommodated within the first sliding groove 121. However, in this case, in order to prevent the widening member 20 from moving back and forth with respect to the outer frame 12 connected thereto, a blocking member such as an engaging member or the like may be disposed on the first boss 1211 or an inner wall of the first sliding groove 121.

In addition, when the opening size of the first sub-groove 1211 is larger than the opening size of the second sub-groove 1212, the opening size of the first sliding groove 121 of the outer frame 12 becomes small from large in a direction away from the accommodation chamber 111. The first boss 21 of the widening member 20 cannot be installed into the first sliding groove 121 in a direction towards the accommodation chamber 111. Therefore, it is necessary to make the widening member 20 slide into the first sliding groove 121 along a length direction X of the outer frame 12 connected thereto, as shown in FIG. 2. Specifically, the first sliding groove 121 penetrates at least one side of the outer frame 12 along the length direction X of the outer frame 12, so that the first boss 21 can slide into the first sliding groove 121 along the length direction X of the outer frame 12.

It should be noted that a thickness of the outer frame 12 in a direction perpendicular to a plane in which the bottom board 11 is located is defined as a height of the outer frame 12, and a width of the outer frame 12 in a direction parallel to the plane in which the bottom board 11 is located and perpendicular to the length direction X is defined as a width of the outer frame 12, wherein "up/down" referred to here is in the height direction of the outer frame 12, "front/rear" is in the width direction of the outer frame 12, and "right/left" is in the length direction of the outer frame 12.

In order to avoid a left-right movement of the widening member 20 with respect to the outer frame 12 connected thereto, a stopper 123 is further disposed on the outer frame 12, and the first sliding groove 121 stops at the stopper 123. That is, in the length direction X of the outer frame 12, the stopper 123 is disposed on one side of the outer frame 12, and the first sliding groove 121 is exposed at a side opposite to the stopper 123. When the first boss 21 of the widening member 20 is slid into the first sliding groove 121, it is blocked by the stopper 123.

Of course, after the first boss 21 is slid into the first sliding groove 121, an engagement structure may be disposed on the inner wall of the first sliding groove 121 or on the first boss 21 in order to prevent the widening member 20 from moving in a direction opposite to the sliding direction of the widening member 121. Specifically, alternatively, a plurality of second bosses 122 are disposed on an inner wall of the second sub-groove 1212, and second grooves 22 are disposed at positions of the second sub-bosses 212 corresponding to the second bosses 122, and the second bosses 122 are located within the second grooves 22. The vertical section shape of the second boss 122 is a right-angled inverted trapezoidal shape, wherein a right-angled side of the right-angled inverted trapezoidal shape is close to the stopper 123, so that assembly of the widening member 20 with the outer frame 12 may be facilitated, and sliding after assembly of the widening member 20 with the outer frame 12 may be avoided.

Alternatively, a width of the second boss 122 is less than a width of the second groove 22, and a height of the second boss 122 is less than a depth of the second groove 22. For example, the width of the second boss 122 may be set to be from 1 mm to 2 mms, the height of the second boss 122 may be set to be from 0.5 mms to 1 mm, and an interval between two adjacent second bosses 122 may be set to be from 30 mms to 50 mms. Correspondingly, the width of the second groove 22 may be set to 1.5 mm to 2.5 mm. The specific number of the second bosses 122 and the second grooves 122 depends on a length of the outer frame 12, for example, the number of the second bosses 122 may be set to be from 6 to 7 for an outer frame 12 of a longer length, and the number of the second bosses 122 may be set to be from 4 to 5 for an outer frame 12 of a shorter length.

Further, in order to enable the widening member 20 to smoothly slide into the outer frame 12, a first chamfer 124 is further disposed on a side of the outer frame 12 away from the stopper 123. Correspondingly, a second chamfer 23 is disposed on a side of the widening member 20 close to the stopper 123.

In the present embodiment, the widening member 20 fixedly connected to the outer frame 12 is provided so that the overall width of the outer frame 12 can be adjusted. Thus, when the on-board display screens having a same visual area size but different appearance sizes are used, only the widening member 20 needs to be changed to meet the requirements of the overall appearance size. The outer frame 12 can be used in common, and thus the mold for the outer frame 12 can be used in common, thereby significantly reducing the number of the mold of the outer frame 12 of the backlight module 100, and thereby reducing a cost of the backlight module 100. At the same time, the widening member 20 slides into the outer frame 12 by a side slide-in design, which has advantages of ease of processing and assembling, and strong structure.

In one embodiment, unlike the embodiment described above, a plurality of the widening members 20 may be disposed on one side of the outer frame 12 opposite to the accommodation chamber 111, and the plurality of the widening members 20 may be detachably connected to each other. As such, the plurality of the widening members 20 are detachably connected to one another and detachably connected to the outer frame 12, such that an adjustable width range of the outer frame 12 is wider and more flexible. Alternatively, widths of the plurality of widening members 20 may be the same or different. For other descriptions, refer to the above embodiment, and details are not described herein.

In another embodiment, unlike the above-described embodiment, the widening members 20 are disposed on both opposite sides of the outer frame 12 opposite to the accommodation chamber 111, and widths of the widening members 20 on the both sides may be same or different. As such, there can be more alternative arrangements to achieve the outer frame of a particular appearance size, such that a design for the outer frame 12 more flexible and there is no need to design the widening members 20 of various sizes. For other descriptions, refer to the above embodiment, and details are not described herein.

Based on the same inventive concept, an embodiment of the present disclosure further provides a display panel including a backlight module 100 of one of the above embodiments. Specifically, the display panel further includes a liquid crystal cell disposed in a light-exiting direction of the backlight module 100, a lower polarizer disposed between the liquid crystal cell and the backlight module 100, and an upper polarizer disposed on a side of the liquid crystal cell away from the backlight module 100. The liquid crystal cell includes an array substrate and a color film substrate disposed opposite to each other, and liquid crystal molecules disposed between the array substrate and the color film substrate.

According to the above-described embodiments,

The present disclosure provides a backlight module and a display panel, wherein the backlight module includes a backboard and a widening member, the backboard includes a bottom board and an outer frame fixedly connected to the bottom board, the outer frame surrounds the bottom board to form an accommodation chamber. The widening member is disposed on at least one side of the outer frame opposite to the accommodation chamber, and detachably connected to the outer frame. The widening member may also be disposed to be fixedly connected to the outer frame, such that an entire width of the outer frame may be adjusted. As such, when on-board display screens having a same visual area size but different appearance sizes are used, only the widening member needs to be changed to meet the requirements of the overall appearance size. The outer frame can be used in common, and thus a mold for the outer frame can be used in common, thereby significantly reducing the number of mold of the outer frame of the backlight module, and thereby reducing a cost of the backlight module.

In the above-described embodiments, descriptions of various embodiments respectively have their own emphasis, and a portion of a certain embodiment that is not detailed may be referred to the related descriptions of other embodiments.

The above described embodiments of the present disclosure are described in detail above, and the principles and embodiments of the present disclosure are described by using specific examples herein. Descriptions of the above described embodiments are merely intended to help understand technical solutions and core ideas of the present disclosure. Those of ordinary skill in the art will appreciate that they may still modify the technical solutions described in the foregoing embodiments, or equivalently replace a portion of the technical features therein. These modifications or substitutions do not deviate the nature of the respective technical solutions from the scope of the technical solutions of the embodiments of the present disclosure.

What is claimed is:

1. A backlight module comprising:
   a backboard comprising a bottom board and an outer frame fixedly connected to the bottom board, wherein the outer frame surrounds the bottom board to form an accommodation chamber; and the outer frame comprises a first side and a second side opposite in a first direction and parallel to each other in a second direction different from the first direction and a third side and a fourth side opposite in the second direction and parallel to each other in the first direction; and
   a plurality of the widening members disposed on a side of the outer frame opposite to the accommodation chamber and detachably connected to the outer frame,
   wherein the plurality of the widening members are detachably connected to each other, and
   wherein for each of the one or more of the first side, the second side, the third side, and the fourth side, a sum of widths of the outer frame and the widening member attached to the outer frame is adjustable by replacing the widening member with an additional widening member with different width from that of the widening member, and the additional widening member is configured to detachably attached to the outer frame.

2. The backlight module according to claim 1, wherein a first sliding groove is disposed on the outer frame, and a first boss is disposed at a position of the widening member corresponding to the first sliding groove, and the first boss is accommodated within the first sliding groove and slidable in the first sliding groove.

3. The backlight module according to claim 2, wherein the first sliding groove comprises a first sub-groove and a second sub-groove in communication with each other, the first boss comprises a first sub-boss and a second sub-boss that are fixedly connected, the first sub-boss is accommodated within the first sub-groove and slidable in the first sub-groove, and the second sub-boss is accommodated within the second sub-groove and slidable in the second sub-groove.

4. The backlight module according to claim 3, wherein an opening size of the first sub-groove is larger than an opening size of the second sub-groove, and the second sub-groove is located on a side of the first sub-groove away from the accommodation chamber.

5. The backlight module according to claim 4, wherein a plurality of second bosses are disposed on an inner wall of the second sub-groove, second grooves are disposed at positions of the second sub-boss corresponding to the second bosses, and each of the second bosses is located within each of the second grooves.

6. The backlight module according to claim 5, wherein a stopper is further disposed on the outer frame, and the first sliding groove stops at the stopper.

7. The backlight module according to claim 6, wherein a vertical section shape of the second boss is a right-angled inverted trapezoidal shape, and wherein a right-angled side of the right-angled inverted trapezoidal shape is close to the stopper.

8. The backlight module according to claim 6, wherein a first chamfer is further disposed on a side of the outer frame away from the stopper, and a second chamfer is disposed on a side of the widening member close to the stopper.

9. The backlight module according to claim 5, wherein a width of the second boss is less than a width of the second groove, and a height of the second boss is less than a depth of the second groove.

10. The backlight module according to claim 5, wherein an interval between two adjacent bosses of the second bosses is 30 mm to 50 mm.

11. The backlight module according to claim 1, wherein widths of the plurality of the widening members are different.

12. The backlight module according to claim 1, wherein the widening members are disposed on both opposite sides of the outer frame opposite to the accommodation chamber, and widths of the widening members on the both sides are same or different.

13. A display panel comprising a backlight module and a liquid crystal cell disposed in a light-exiting direction of the backlight module, wherein the backlight module comprises:
a backboard comprising a bottom board and an outer frame fixedly connected to the bottom board, wherein the outer frame surrounds the bottom board to form an accommodation chamber; and the outer frame comprises a first side and a second side opposite in a first direction and parallel to each other in a second direction different from the first direction and a third side and a fourth side opposite in the second direction and parallel to each other in the first direction; and
a plurality of the widening members disposed on a side of the outer frame opposite to the accommodation chamber and detachably connected to the outer frame,
wherein the plurality of the widening members are detachably connected to each other, and
wherein for each of the one or more of the first side, the second side, the third side, and the fourth side, a sum of widths of the outer frame and the widening member attached to the outer frame is adjustable by replacing the widening member with an additional widening member with different width from that of the widening member, and the additional widening member is configured to detachably attached to the outer frame.

14. The display panel according to claim 13, wherein a first sliding groove is disposed on the outer frame, and a first boss is disposed at a position of the widening member corresponding to the first sliding groove, and the first boss is accommodated within the first sliding groove and slidable in the first sliding groove.

15. The display panel according to claim 14, wherein the first sliding groove comprises a first sub-groove and a second sub-groove in communication with each other, the first boss comprises a first sub-boss and a second sub-boss that are fixedly connected, the first sub-boss is accommodated within the first sub-groove and slidable in the first sub-groove, and the second sub-boss is accommodated within the second sub-groove and slidable in the second sub-groove.

16. The display panel according to claim 15, wherein an opening size of the first sub-groove is larger than an opening size of the second sub-groove, and the second sub-groove is located on a side of the first sub-groove away from the accommodation chamber.

17. The display panel according to claim 16, wherein a plurality of second bosses are disposed on an inner wall of the second sub-groove, second grooves are disposed at positions of the second sub-boss corresponding to the second bosses, and each of the second bosses is located within each of the second grooves.

18. The display panel according to claim 17, wherein a stopper is further disposed on the outer frame, and the first sliding groove stops at the stopper.

19. The display panel according to claim 18, wherein a first chamfer is further disposed on a side of the outer frame away from the stopper, and a second chamfer is disposed on a side of the widening member close to the stopper.

20. A backlight module comprising:
a backboard comprising a bottom board and an outer frame fixedly connected to the bottom board, wherein the outer frame surrounds the bottom board to form an accommodation chamber, and the outer frame comprises a first side and a second side opposite in a first direction and parallel to each other in a second direction different from the first direction and a third side and a fourth side opposite in the second direction and parallel to each other in the first direction; and
one or more first widening members detachably attached to one or more outside surfaces of the outer frame away from the accommodation chamber at one or more of the first side, the second side, the third side, and the fourth side, respectively, wherein the one or more first widening members are detachably connected to each other,
wherein for each of the one or more of the first side, the second side, the third side, and the fourth side, a sum of widths of the outer frame and the first widening member attached to the outer frame is adjustable by replacing the first widening member with a second widening member with different width from that of the first widening member, and the second widening member is configured to detachably attached to the outer frame.

* * * * *